(12) United States Patent
Bohner et al.

(10) Patent No.: US 6,285,936 B1
(45) Date of Patent: Sep. 4, 2001

(54) STEERING SYSTEM FOR A VEHICLE

(75) Inventors: Hubert Bohner, Boeblingen; Mathias Hartl, Kernen; Gerhard Kurz, Wendlingen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/397,731

(22) Filed: Sep. 17, 1999

(30) Foreign Application Priority Data

Sep. 17, 1998 (DE) .............................................. 198 42 627

(51) Int. Cl.$^7$ ....................................................... B62D 6/00
(52) U.S. Cl. ........................... 701/41; 180/422; 180/443; 701/43
(58) Field of Search ..................... 701/41–43; 180/402, 180/404, 405, 407, 421, 422, 443; 318/5, 564, 588

(56) References Cited

U.S. PATENT DOCUMENTS

| | | | |
|---|---|---|---|
| 5,267,627 | * 12/1993 | Frank et al. | 180/422 |
| 5,747,950 | 5/1998 | Friedrichsen et al. | 318/5 |
| 6,152,254 | * 11/2000 | Phillips | 180/422 |

FOREIGN PATENT DOCUMENTS

| | | |
|---|---|---|
| 196 22 731 A1 | 12/1997 | (DE) . |
| 2 259 892 | 3/1993 | (GB) . |
| 2 308 107 | 6/1997 | (GB) . |
| 63-162378 | 7/1988 | (JP) . |
| 4-151378 | 5/1992 | (JP) . |
| 6-22151 | 3/1994 | (JP) . |

\* cited by examiner

*Primary Examiner*—William A. Cuchlinski, Jr.
*Assistant Examiner*—Edward Pipala
(74) *Attorney, Agent, or Firm*—Crowell & Moring, L.L.P.

(57) ABSTRACT

A steering system for vehicles can be operated in a normal mode, in which a steering handle actuated by the driver and steered vehicle wheels are connected to one another via a control system, and in an emergency mode, in which the steering handle and the steered vehicle wheels are positively coupled. To achieve a steering system which increases the operational reliability of the steering system by simple design measures, a steering-angle control unit for a steering-angle actuator actuates the steered vehicle wheels. The control unit contains a first steering-angle control system, and a manual-torque control unit for a manual-torque actuator actuates the steering handle for the purpose of simulating manual torques. The control unit also contains a first manual-torque control system, and the steering-angle control unit comprises a second manual-torque control system, which is connected redundantly with the first manual-torque control system of the manual-torque control unit. The manual-torque control unit comprises a second steering-angle control system which is connected redundantly with the first steering-angle control system of the steering-angle control unit.

15 Claims, 1 Drawing Sheet

STEERING SYSTEM FOR A VEHICLE

CROSS REFERENCE TO RELATED APPLICATION

This application is related to application Ser. No. 09/397,732 filed on Sep. 17, 1999 in the name of Hubert Bohner et al. for Method For Operating A Vehicle Steering System; Ser. No. 09/396,409 filed on Sep. 15, 1999 in the name of Hubert Bohner et al. for Steering System For A Vehicle; and Ser. No. 09/392,650 filed on Sep. 9, 1999 in the name of Hubert Bohner et al. for Steering System For Non-Tracked Motor Vehicles.

BACKGROUND OF THE INVENTION

This application claims the priority of 198 42 627.5-21, filed Sep. 17, 1998.

The present invention relates to a steering system for vehicles, which can be operated in a normal mode, in which a steering handle and steered vehicle wheels are connected to one another via an electric or electronic control system (steer-by-wire level), and in an emergency mode, in which the steering handle and the steered vehicle wheels are positively coupled mechanically and/or hydraulically (fall-back level).

A two level steering system of this kind generally has a control unit which continuously monitors the functionality of the steer-by-wire components of the steering system and, in particular, checks redundantly available information for plausibility. As soon as the control unit detects a fault, it switches from normal mode to emergency mode to enable higher operational reliability to be ensured for the vehicle.

The so-called "fall-back level" of the steering system, i.e. the mechanical and/or hydraulic positive coupling which is activated in the emergency mode between the steering handle and the steered vehicle wheels, can be formed, for example, by a conventional steering line containing a clutch by way of which the mechanical steering line can be activated for emergency operation.

As an alternative to a mechanical steering line, hydraulic positive coupling via a so-called "hydraulic rod" can also be provided. A hydraulic rod of this kind has a manual-side, first piston-cylinder unit, the piston of which is displaced axially in the associated cylinder by actuations of the steering handle. Hydraulic fluid is displaced out of a chamber formed by the piston in the cylinder and fed to a wheel-side, second piston-cylinder unit. The hydraulic fluid displaced out of the first piston-cylinder unit displaces the associated piston in the second piston-cylinder unit, this piston being coupled mechanically to the steered vehicle wheels, which turn as a result.

DE 196 22 731 A1 discloses a hydrostatic steering device which has two control systems. Each of these control systems has a hydraulic pump, a servo valve and a servomotor. The servo valves are actuated by a common steering wheel. The known steering device furthermore has a change-over valve which, in its operating position, hydraulically connects the motor lines of the second control system and, in an emergency position, hydraulically connects the motor lines of the first control system. Also provided is an actuating device which responds when a fault occurs in the first control system and switches the change-over valve from the operating position into the emergency position. With the known steering device. Therefore, servo-assisted steering is possible even if the first control system fails. A steering device of this kind, which has two complete, separately operating control systems, is relatively expensive.

SUMMARY OF THE INVENTION

An object of the present invention is to provide a configuration for a two-level steering system which increases the operational reliability of the steering system by simple measures.

According to the invention, this object has been achieved by a steering system in which the steering handle and the steered vehicle wheels are positively coupled mechanically and/or hydraulically (fall-back level), having a steering-angle control unit for a steering-angle actuator, e.g. an electric hydraulic servomotor, which actuates the steered vehicle wheels, the said control unit containing a first steering-angle control system which compares the actual steering-angle values from an actual steering-angle transmitter actuated with the steered vehicle wheels and desired steering-angle values from a desired steering-angle transmitter actuated with the steering handle and, as a function thereof, actuates the steering-angle actuator, and having a manual-torque control unit for a manual-torque actuator which actuates the steering handle for the purpose of simulating manual torques, the said control unit containing a first manual-torque control system, which generates desired manual-torque values correlated with the forces acting at the steered vehicle wheels and compares them with actual manual-torque values from an actual. manual-torque transmitter actuated with the steering handle and, as a function thereof, actuates the manual-torque actuator, the-control units monito ring themselves and the steering system for functional reliability and plausibility and switching between the normal mode and the emergency mode of the steering system as a function of this monitoring, the steering-angle control unit comprising a second manual-torque control system, which is connected redundantly with the first manual-torque control system of the manual-torque control unit, and the manual-torque control unit comprising a second steering-angle control system, which is connected redundantly with the first steering-angle control system of the steering-angle control unit.

The invention is based on the recognition of the advantages providing a first control unit (steering-angle control unit) for the steer-by-wire level, the first control device being intended for the actuation of a wheel-angle actuator, and a second control unit (manual-torque control unit) for simulating manual torques at the steering handle. The control units in each case are configured such that each control unit can additionally perform sub- functions or even all functions of the other control unit, there thus being a redundant control unit available for each control unit. The control units preferably operate in a computer-assisted manner and are thus programmable. Thus, additional functions can be integrated into the control units with little effort by altering the programming. The fail-safe nature of the steering system is thereby significantly improved.

According to an advantageous embodiment of the steering system according to the invention, the control units and the sensors assigned to them are connected to one another via a databus. This allows complete information exchange between the control units and the respectively assigned sensors with little outlay.

In a particularly advantageous embodiment of the steering system according to the invention, the steering system can be operated in a maintained-comfort emergency mode. That is, servo assistance is provided for the mechanical and/or hydraulic positive coupling of the fall-back level. This servo assistance reduces the manual torques required to actuate the steering handle and thereby facilitates steering actuation of the steering handle. The servo assistance is preferably implemented by still-functional elements of the steer-by-wire level of the steering system. For example, servo assistance can be provided by the manual-torque actuator which, given appropriate control, reduces the manual torques required for steering actuation by virtue of its coupling to the steering handle.

In a steer-by-wire level operating with, for example, a hydraulic servo motor and a hydraulically positively coupled fall-back level, appropriate coupling of the hydraulic systems can be employed to enable the hydraulic circuit provided for the actuation of the servo motor to be used for servo assistance for the hydraulic positive coupling of-the fall-back level.

The steering characteristics of the vehicle in normal mode differ very markedly from those in emergency mode as regards the required manual torques to be applied by the driver at the steering handle. As a result, a change between the operating states during a journey, particularly while cornering, is dangerous. Due to the maintained-comfort emergency mode according to the invention, the steering system advantageously provides an operating mode for a (partial) failure of the steer-by-wire level that corresponds essentially to conventional servo-assisted steering. The transition between the normal mode and the maintained-comfort emergency mode can be such that it is not noticed by the driver. The driver, can, however, expediently be given a corresponding warning encouraging a garage visit soon. Only small structural measures need to be carried out to implement a servo-assisted maintained-comfort emergency mode of this kind.

Another important concept of the steering system according to the present invention resides in the fact that the control units of the steering system have access to parameters, data, signals and the like of other electrical or electronic vehicle components so that they can generate information (signal values) from these which are redundant relative to the information (signal values) which is generated by the sensors assigned to the control units. This flow of information can be implemented in a particularly simple manner if the control units are connected via a databus to a vehicle computer in which the above mentioned vehicle operating parameters are available or to which these parameters are supplied.

BRIEF DESCRIPTION OF THE DRAWINGS

Other objects, advantages and novel features of the present invention will become apparent from the following detailed description of the invention when considered in conjunction with the accompanying drawings.

The sole FIGURE is a schematic view of a steering system according to the invention.

DETAILED DESCRIPTION OF THE DRAWINGS

Figure 1:
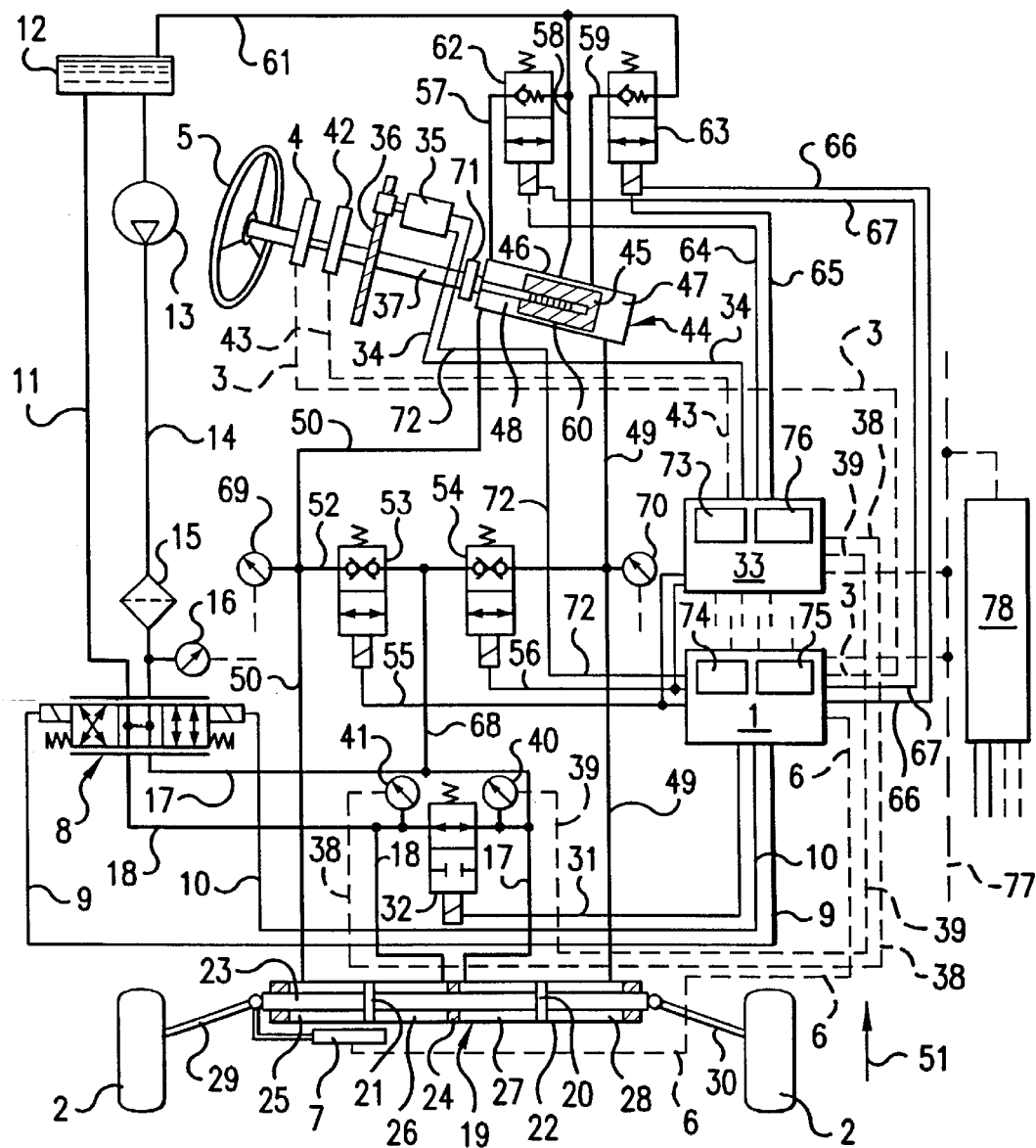

The illustrated steering system according to the invention has a steering-angle control unit 1 which is used to actuate steered vehicle wheels 2. The steering-angle control unit 1 is connected by a signal line 3 to a desired steering-angle transmitter 4 coupled to a steering handle configured as a steering wheel 5. The steering-angle control unit 1 is furthermore connected, by a signal line 6, to an actual steering-angle transmitter 7. The steering-angle control unit 1 carries out a comparison between the desired and the actual values for the steering angles and, as a function thereof, switches a control valve 8 to which it is connected by corresponding switching lines 9, 10.

On one hand, the control valve 8 is connected via a return line 11 to a hydraulic-fluid reservoir 12 and via a hydraulic line 14 to the delivery side of a hydraulic pump 13, the inlet side of which is likewise connected to the hydraulic-fluid reservoir 12. Between the hydraulic pump 13 and the control valve 8, the hydraulic line 14 also contains a pressure filter 15 and a pressure-measuring device 16. On the other hand, the control valve 8 is connected via pressure lines 17, 18 to a servo motor 19 configured as a piston-cylinder unit. If the power fails, the control valve 8 assumes the position illustrated in FIG. 1, in which all the connections of the control valve 8 are short-circuited.

The servo motor 19 has two pistons 20, 21, which are fixed to a piston rod 23 passing axially through a cylinder 22 of the servo motor 19. An axial dividing wall 24, through which the piston rod 23 passes, is formed in the cylinder 22 between the pistons 20, 21. As a result, a total of four chambers 25, 26, 27, 28 are formed in the cylinder 22 of the servo motor 19. In this arrangement, the chambers 26, 27 arranged on each side of the dividing wall 24 are pressurized by the pressure lines 17, 18 of the control valve 8 in order to displace the pistons 20 and 21 and hence the piston rod 23 axially. The piston rod 23 is coupled to the steered vehicle wheels 2 by steering rods or track rods 29, 30. Consequently, an axial displacement of the piston rod 23 results in a steering adjustment of the steered vehicle wheels 2.

The steering-angle control unit 1 is furthermore connected by a switching line 31 to a first safety valve 32 which, when de-energized, occupies the position illustrated in FIG. 1, in which the pressure lines 17, 18 are short-circuited. For steer-by-wire operation of the steering system, the steering-angle control unit 1 switches the first safety valve 32 into the other position, i.e., in which the pressure lines 17, 18 are separated from one another.

To enable the steering-angle control unit 1 to perform all its assigned functions, it is equipped with a first steering-angle control system 74 in the form of a circuit or a program.

In order to give the driver a feeling for the side forces acting on the steered vehicle wheels 2, the steering system according to the present invention has a manual-torque control unit 33 which actuates, via a switching line, a manual-torque actuator 35 configured as an electric motor. This manual-torque actuator 35 is coupled directly or indirectly by way of a gear 36 or the like to a steering spindle 37 which is actuated by the steering wheel 5 and is supported at 71.

The manual-torque control unit 33 is furthermore connected by signal lines 38, 39 to two pressure-measuring devices 40, 41, of which one pressure-measuring device 40 communicates with one pressure line 17 and the other pressure-measuring device 41 communicates with the other pressure line 18. In this way, the manual-torque control unit 33 can determine pressure differences. between the chambers 26, 27. From these differences the side forces acting on the steered vehicle wheels 2 can be determined. As a function of the side forces determined, the manual-torque control unit 33 generates a desired manual-torque value that is to take effect at the steering wheel 5.

To simulate this manual torque at the steering wheel 5, the manual-torque actuator 35 is actuated in an appropriate manner. In this arrangement, the steering spindle 37 is coupled to an actual manual-torque transmitter 42, which is connected by a signal line 43 to the manual-torque control unit 33. The manual torque transmitted to the steering wheel 5 by the manual-torque actuator 35 is regulated by comparing the desired values and actual values for the manual torques.

To enable the manual-torque control unit 33 to perform all its assigned functions, it is equipped with a first manual-torque control system 73 which can be a circuit or a program.

For emergency operation, i.e. for the eventuality that the steer-by-wire level is defective, the steering system according to the invention has an emergency or fall-back level, on which there is mechanical and hydraulic positive coupling between the steering handle 5 and the steered vehicle wheels 2. For this purpose, the steering spindle 37 actuated by the steering handle 5 is coupled to a piston-cylinder unit 44. In this arrangement, the steering spindle 37, has an axial end interacting with the piston-cylinder unit 44 and configured as a spindle drive which interacts with a piston 45 of the piston-cylinder unit 44 such that rotary displacements of the steering spindle 37 result in an axial displacement of the piston 45 in a cylinder 46 of the piston-cylinder unit 44.

In the cylinder 46, the piston 45 axially separates two chambers 47, 48 which are connected by hydraulic lines 49, 50 to axially outer chambers 25, 28, respectively, of the servo motor 19. Because the hydraulic system for this positive coupling between the steering handle 5 and the steered vehicle wheels 2 is sealed off and since the hydraulic fluid is essentially incompressible, the right-hand chamber 47 of the piston-cylinder unit 44, the right-hand chamber 28 of the servo motor 19 and the right-hand hydraulic line 49 connecting these chambers 47, 28 to one another (the term "right-hand" referring to the direction of travel symbolized by an arrow 51) are referred to as the "right-hand hydraulic rod". Similarly, the left-hand chamber 48 of the piston-cylinder unit 44, the left-hand chamber 25 of the servo motor 19 and the left-hand hydraulic line 50 connecting them are referred to as the "left-hand hydraulic rod".

The left-hand hydraulic line 50 can communicate with the right-hand hydraulic line 49 via a connecting line 52. For this to occur, however, a second safety valve 53 and a third safety valve 54 must be actuated accordingly. The second safety valve 53 and the third safety valve 54 are connected by switching lines 55, 56 to the steering-angle control unit 1 and the manual-torque control unit 33. In FIG. 1, the second and the third safety valves 53, 54 are in their de-energized position, apposition they assume automatically for emergency operation. In this position, the connections of the safety valves 53, 54 are shut off and the hydraulic lines 49, 50 thus do not communicate with one another via the connecting line 52.

To enable the functional reliability of the fall-back level to be guaranteed, three bleed lines 57, 58, 59 are connected to the piston-cylinder unit 44. These bleed lines form the geodetically highest points of the hydraulic system of the fall-back level. Bleed line 58, which communicates with a relatively unpressurized annular space 60 in the cylinder 46 formed between chambers 47, 48 is connected continuously to the hydraulic-fluid reservoir 12 by a return line 61. In contrast, bleed lines 57, 59 which communicate with the pressurized chambers 46, 47 can only be connected to the return line 61 via bleed valves 62, 63. On one hand, the bleed valves 62, 63 can be actuated via switching lines 64, 65 by the manual-torque control unit 33 and via switching lines 66, 67, separate therefrom, by the steering-angle control unit 1.

The pressurization of the hydraulic rods and the hydraulic positive coupling of the fall-back level are performed via a hydraulic coupling line 68 which is connected to the connecting line 52 between the second and the third safety valves 53, 54 and connects the connecting line 52 to the pressure line 17. This allows the left-hand hydraulic line 50 or the right-hand hydraulic line 49, or both, to be connected to the delivery side of the hydraulic pump 13 by appropriate operation of the safety valves 53, 54 and of the control valve 8.

Communicating with the hydraulic lines 49, 50 are pressure-measuring devices 69, 70, by way of which the control units 1, 33 respectively, can check the leak tightness of the hydraulic system of the fall-back level.

In a currently preferred embodiment, the control units 1, 33 and all the sensors (e.g. pressure-measuring devices, actual/desired value transmitters) are connected by a common databus. This considerably simplifies the arrangement of the signal lines and also gives each component access to all the information which is transported on the bus. Particularly when one or more databuses are used to connect the components of the steering system, the correspondingly configured, or correspondingly programmed, control units 1, 33 can complement or substitute for one another.

For the foregoing purpose, the steering-angle control unit 1 contains a second manual-torque control system 75, which can perform all the functions of the manual-torque control unit 33 and can be a circuit or a program. The manual-torque control unit 33 furthermore contains a second steering-angle control system 76, which can perform all the functions of the steering-angle control unit 1 and can be a circuit or as a program. To enable the control units 1, 33 to complement and substitute for one another with regard to their switching functions as well, separate amplifiers are preferably provided to make available the switching power for the elements to be switched, e.g. valves and control elements.

It is expedient if, together with the manual-torque actuator 35, the manual-torque control unit 33 forms a subassembly which can be installed together and is installed in the vehicle in the region of a dashboard, for example, in the vicinity of the steering handle 5. The actual manual-torque transmitter 42 is then also situated in proximity to this subassembly or integrated into it only the pressure-measuring devices 40, 41 are arranged in the vicinity of the servo motor 19, making it necessary to lay cables in the vehicle to make the connection with the manual-torque control unit 33, at least for the signal lines 38, 39.

The steering-angle control unit 1 is also generally combined with the servo motor 19 to form a subassembly which can be installed together but is fitted on the vehicle in the region of the steering linkage 29, 30, in the vicinity of the steered vehicle wheels 2. The actual steering-angle transmitter 7 can be expediently integrated into this subassembly. The control valve 8 and the entire hydraulic circuit for the actuation of the servo motor 19 can likewise be accommodated in the vicinity of the latter. Only the desired steering-angle transmitter 4 is arranged in the region of the steering handle 5, making it necessary to lay one cable in the vehicle at least for the signal line 3.

The reciprocal redundancy of the control units 1, 33 in the present invention is achieved in a particularly simple manner without a high outlay in design terms. If standardized programmable components are used for the control units 1, 33, it is essentially a matter of programming whether control unit 1 or control unit 33 is used to actuate the manual-torque actuator 35 or to actuate the steering-angle actuator (servo motor 19). Accordingly, the control units 1, 33 can be configured, more particularly programmed, such that they can be used both to actuate the manual-torque actuator 35 and the steering-angle actuator 19.

Because cables for the signal lines 38, 39 for connecting the pressure-measuring devices 40, 41 to the manual-torque control unit 33 and for the signal line 3 for connecting the desired steering-angle transmitter 4 to the steering-angle control unit 1 have to be laid in any event, a databus can be laid instead without any additional outlay.

Consequently, both control units 1, 33 can call up the signal values of all the sensors, and all or some of the switching elements can be actuated via power cables laid from both control units 1, 33 to the switching elements. In this way, the control units 1, 33 can support and substitute for one another. The configuration according to the invention thus increases the safety of the steering system.

In a preferred configuration, the switching elements which can be actuated by the two control units 1, 33, e.g. valves, electric motor, electric clutch in a steering line, are equipped with separate windings, each of which is assigned to one of the control units 1, 33. For example, the valves each have two actuating magnets that can be switched separately and independently. This improves fail-safety, particularly as regards short-circuit proofing.

According to a particularly advantageous embodiment of the steering system according to the invention, the control units 1, 33 can operate the steering system in a maintained-comfort emergency mode in the event that only some parts of the steer-by-wire level of the steering system are operating incorrectly. This mode operates essentially like a conventional servo-assisted steering system with positive coupling between the steering handle 5 and steered vehicle wheels 2. If, for example, the control valve 8 sticks, the safety valves 32, 53, 54 are switched to the position shown in FIG. 1. As a result, the steering actuation of the steered vehicle wheels 2 takes place as a function of the axial displacement of the piston 45 in the manual-side piston-cylinder unit 44.

To ensure that the driver does not have to supply by hand, at the steering wheel 5, the entire manual torque required for a steering adjustment of the steered vehicle wheels 2, the manual-torque actuator 35 is used as the source of servo assistance in this maintained-comfort emergency mode. For this purpose, the actuator 35 is driven in an appropriate manner by the manual-torque control unit 33 via switching line 34 or by the steering-angle control unit 1 via a switching line 72.

In the event of another defect, the control valve 8 and the safety valves 53, 54 can be controlled by the control units 1, 33 so that the wheel-side piston-cylinder unit (servo motor 19) is actuated hydraulically as a function of the actuation of the steering handle 5. Hydraulic servo assistance is obtained in this way for the axial displacement of the piston 45 and for the piston rod 23 of the servo motor 19. Only if those components of the steer-by-wire level which can be used for servo assistance fail is it necessary that the steering system according to the invention be operated in emergency mode without servo assistance.

Another important aspect of the steering system according to the invention resides in the fact that, on one hand, the hydraulic system of the fall-back level (the hydraulic rods) is bled via the bleed valves 62, 63 at regular intervals during the normal operation of the steering system, allowing functional impairments of the fall-back level to be eliminated. On the other hand, tests on the leak tightness of the hydraulic components of the fall-back level are carried out at regular intervals. The left-hand hydraulic rod can be checked out independently of the right-hand hydraulic rod. In this way, any leaks can be located relatively accurately.

If the steering system or its control units 1, 33 detects/ detect a malfunction on the fall-back level, this can be indicated to the driver. In any event, this malfunction is indicated at the next vehicle service. Depending on the safety concept, provision can also be made for the maximum speed of the vehicle, its range or the like to be limited. For example, the vehicle will only be allowed to drive at low speed to the nearest garage.

If the control units 1 and 33 communicate via a bus 77, for example, with one or more vehicle computers 78, the information acquired and processed by the respective computer can be used by the control units 1, 33 to perform plausibility checks or to obtain redundant signals for failed sensors or their signals.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle steering system operable in a normal mode in which a driver-actuatable steering handle, and steered vehicle wheels are operatively connected to one another via an electric or electronic control system, and in an emergency mode in which the steering handle and the steered vehicle wheels are positively coupled at least one of mechanically and hydraulically, comprising a steering-angle control unit for a steering-angle actuator, which is arranged to actuate the steered vehicle wheels, the control unit comprising a first steering-angle control system which is configured to compare the actual steering-angle values from an actual steering-angle transmitter actuated with the steered vehicle wheels and desired steering-angle values from a desired steering-angle transmitter actuated with the steering handle and, as a function thereof, to actuate the steering-angle actuator, and a manual-torque control unit for a manual-torque actuator configured to actuate the steering handle for simulating manual torques, the manual torque control unit comprising a first manual-torque control system to generate desired manual-torque values correlated with forces acting at the steered vehicle wheels and to compare the forces with actual manual-torque values from an actual manual-torque transmitter actuatable with the steering handle and, as a function thereof, to actuate the manual-torque actuator, the control units being configured to monitor themselves and the steering system for functional reliability and plausibility, and switching between the normal mode and the emergency mode of the steering system as a function of this monitoring, the steering-angle control unit further comprising a second manual-torque control system connected redundantly with the first manual-torque control system of the manual-torque control unit, and the manual-torque control unit further comprising a second steering-angle control system connected redundantly with the first steering-angle control system of the steering-angle control unit.

2. The steering system according to claim 1, wherein at lest one databus is operatively connected to the control units and associated sensors.

3. The steering system according to claim 2, wherein at least one further vehicle control unit is also connected to the at least one databus.

4. The steering system according to claim 1, wherein the control units are configured to perform a functionality check of at least one of the mechanical and hydraulic positive coupling of a fall-back level for the emergency mode during the normal mode.

5. The steering system according to claim 4, wherein the at least one mechanical and hydraulic positive coupling of the fall-back level has a manual-side piston-cylinder unit actuatable mechanically with the steering handle and configured to hydraulically actuate a wheel-side piston-cylinder unit for mechanically actuating the steered vehicle wheels.

6. The steering system according to claim 4, where to check the functionality of the fall-back level, the control units are configured to check a hydraulic circuit of the positive coupling for at least one of leak tightness and prevailing system pressure level.

7. The steering system according to claim 6, wherein the at least one mechanical and hydraulic positive coupling of the fall-back level has a manual-side piston-cylinder unit actuatable mechanically with the steering handle and configured to hydraulically actuate a wheel-side piston-cylinder unit for mechanically actuating the steered vehicle wheels.

8. The steering system according to claim 4, wherein the positive coupling comprises a mechanical steering line dividable by an electrically or hydraulically actuated clutch, and proximity switches for function checking, are arranged for at least one of responding when the clutch is closed briefly on a routine basis, function checking at least one of the electric clutch, its current and voltage supply, and function checking the hydraulic clutch, and pressure sensors to monitor a minimum permissible opening pressure.

9. The steering system according to claim 1, wherein the control units are configured to operate the steering system in a maintained-comfort emergency mode whereby servo assistance is provided for at least one of the mechanical and hydraulic positive coupling of a fall-back level in the emergency mode.

10. The steering system according to claim 9, wherein the steering-angle actuator is a hydraulic servomotor actuatable by a servo valve connected to a hydraulic pump, and servo-assistance in a maintained-comfort emergency mode is provided by a hydraulic circuit of the servo motor which is hydraulically coupled to piston-cylinder units of the positive coupling and provides servo-assistance for actuation thereof.

11. The steering system according to claim 9, wherein the manual-torque actuator is configured to provide the servo assistance to assist actuations of the steering handle.

12. The steering system according to claim 11, wherein the steering-angle actuator is a hydraulic servomotor actuatable by a servo valve connected to a hydraulic pump, and servo-assistance in a maintained-comfort emergency mode is provided by a hydraulic circuit of the servo motor which is hydraulically coupled to piston-cylinder units of the positive coupling and provides servo-assistance for actuation thereof.

13. The steering system according to claim 1, wherein the control units are operatively connected, via a databus, to a vehicle computer to further sensors which are connected and configured to utilize available vehicle operating parameters to generate signals which are redundant relative to the signals generated on the basis of measured values of at least one sensor assigned to the control units.

14. The steering system according to claim 1, wherein separate independent switching lines connect each of the control units to one or more switching elements, to be selectively actuatable by the control units.

15. The steering system according to claim 14, wherein the switching elements each have separately energizable windings to actuate the respective switching element, one of which windings is assigned to one control unit and the other of which is assigned to the other control unit.

* * * * *